United States Patent

[11] 3,546,372

[72] Inventors Robert A. Dischert
Burlington;
Robert R. Brooks, Willingboro; William J. Cosgrove, Marlton, New Jersey

[21] Appl. No. 717,597
[22] Filed April 1, 1968
[45] Patented Dec. 8, 1970
[73] Assignee RCA Corporation
a corporation of Delaware

[54] VERTICAL AND HORIZONTAL APERTURE EQUALIZATION
11 Claims, 2 Drawing Figs.

[52] U.S. Cl. ..... 178/5.4, 178/7.1
[51] Int. Cl. ..... H04n 3/16, H04n 5/38
[50] Field of Search ..... 178/5.4, 7.1(AC)

[56] References Cited

UNITED STATES PATENTS

| | | | |
|---|---|---|---|
| 2,884,482 | 4/1959 | Pritchard | 178/5.4 |
| 3,030,440 | 4/1962 | Schade, Jr. | 178/6 |
| 3,463,874 | 8/1969 | Hodge et al. | 178/5.4 |

*Primary Examiner*—Robert L. Griffin
*Assistant Examiner*—Donald E. Stout
*Attorney*—Eugene M. Whitacre

ABSTRACT: In television systems which reproduce an image in successive fields having interlaced scanning lines, aperture distortion of the image is caused by the finite spots of the scanning beam employed in camera tubes and image-reproducing tubes, and lens aberration in the optical systems used in conjunction with the camera tubes. By providing aperture distortion correction apparatus which provides linear phase-versus-frequency peaking of video signals and which "combs" the aperture correction signal at the color subcarrier frequency, an aperture distortion correction signal is produced which will symmetrically restore detail in both the vertical and horizontal directions without adding noise to a color video signal.

Inventors:
ROBERT A. DISCHERT,
ROBERT R. BROOKS &
WILLIAM J. COSGROVE

BY Eugene M. Whitacre
ATTORNEY

VERTICAL AND HORIZONTAL APERTURE EQUALIZATION

BACKGROUND OF THE INVENTION

This invention relates to television systems and particularly to apparatus for providing aperture equalization to a video signal in both the horizontal and vertical directions in a television system which reproduces an image in successive fields having interlaced horizontal lines.

The finite size of the spots of the scanning beams employed in television camera tubes and in television image reproducing tubes, and lens aberration in the optical systems commonly utilized in conjunction with the camera tubes cause aperture distortion of the image. This aperture distortion manifests itself as a loss of resolution when the scanning spots are large enough to cover more than one picture element at the same time. Aperture distortion is common to both black and white and color television systems. Various methods have been employed to reduce the aperture distortion and restore the detail to the edges of the video signals representative of the image to be reproduced. It is known that a correction signal may be added to the video signal to restore detail to the video signal.

In a compatible color television system it is desirable to keep the luminance and chrominance components of the video signal separated so that noise associated with one signal will not show up as noise on the other signal as a result of heterodyning in the receiver circuits. In compliance with present broadcasting standards for color television systems a subcarrier frequency is selected and modulated by the color video signals such that the color video information is contained primarily in the portions of the frequency spectrum interlaced between the portions of the frequency spectrum containing the luminance information. So that the aperture distortion correction signal added to the video signal does not introduce noise into the video component not being corrected it is known that the correction signal may be passed through a comb filter. It is noted that the luminance energy appears in bunches of sidebands spaced apart in frequency by the line-scanning rate. In like manner the chrominance energy appears in bunches of sidebands spaced apart in frequency by the line scanning rate, but is displaced between the bunches of luminance sidebands. A comb filter will selectively attenuate one of the luminance or chrominance signals to the relative exclusion of the other. Such filtering action is referred to as "combing." By "combing" the correction signal at the subcarrier frequency the correction signal will have minimum response at the subcarrier frequency and at multiples of line frequency intervals from the subcarrier frequency.

It is known that aperture correction in the horizontal direction may be effected by a "subtraction" method utilizing a low pass filter having a cutoff frequency at some point within the bandwidth of the video signal. By this method an inverted video signal is passed through a low pass filter and combined with an uninverted video signal. In this manner, the low frequency components of opposite polarity cancel, resulting in an effective peaking of the higher frequency components of the video signal. However, such a filter has a nonlinear phase characteristic in the region between maximum response and cutoff and a video signal passed through such a filter will have the phase of its frequency component altered according to the characteristics of the filter. Hence, the combined video signal will have nonlinear phase characteristics which will result in an undesirable asymmetric aperture correction.

SUMMARY OF THE INVENTION

In a television system including a source of video signals and in which the video signals are to be employed to reproduce an image in successive fields have interlaced horizontal lines, apparatus is provided to produce an aperture distortion correction signal to restore detail to the video signal in both the horizontal and vertical directions without introducing high frequency noise to the video signal, the apparatus also producing a correction signal having a substantially linear phase-versus-frequency characteristic for all frequencies within the video bandwidth.

It is an object of this invention to provide improved apparatus for restoring detail to a video signal.

It is another object of this invention to provide improved apparatus for restoring detail to a video signal in a horizontal direction without adding high frequency noise to the video signal.

It is still another object of this invention to provide improved apparatus for equalizing the higher frequency components within a video signal bandwidth without distorting the phase of the higher frequency components.

The invention is more fully described in the following specification and claims taken in conjunction with the accompanying drawings in which:

DESCRIPTION

Figure 1:
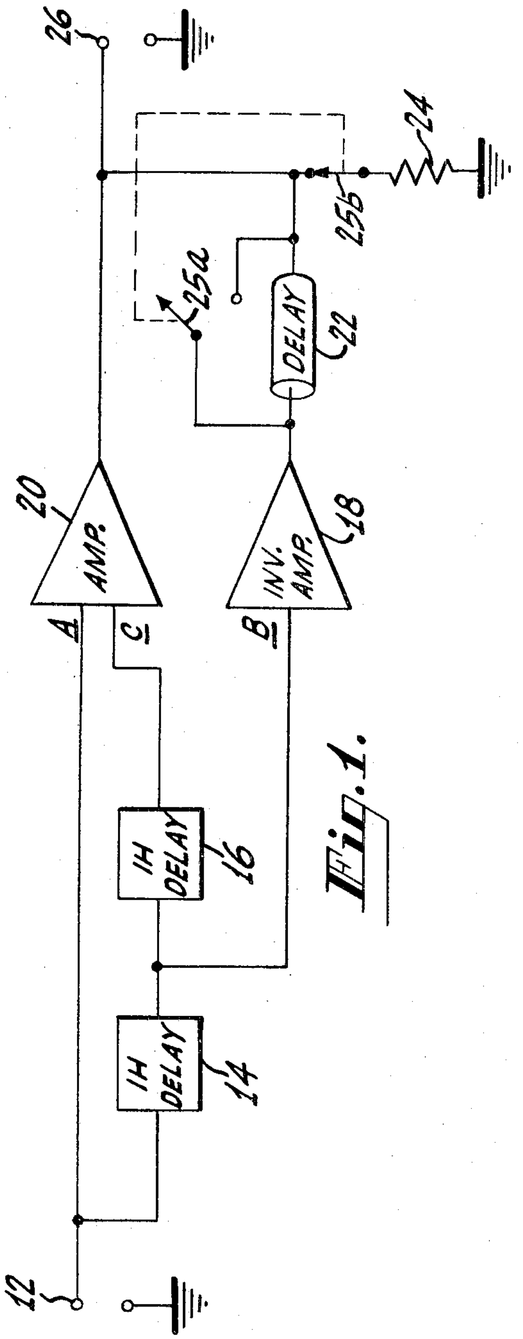
FIG. 1 is a functional diagram of an embodiment of the invention.

FIG. 1 shows those components of a television system necessary to develop a combed aperture distortion correction signal. Video signals from a suitable source such as an image pickup tube in a television camera, for example, are connected to video signal input terminal 12. Terminal 12 is connected to an input circuit A of amplifier 20. Terminal 12 is also connected to a delaying device 14. The delay time of delaying device 14 is substantially equal to the time required to scan one line of the interlaced television raster, or approximately 63.5 microseconds. Delaying device 14 may be any suitable delaying device, preferably having a bandwidth of at least 0 to 4 megacycles to pass the components of the video signal. The output terminals of delaying device 14 are connected to an input circuit B of amplifier 18. The output terminals of delaying device 14 are also connected to the input terminal of a second delaying device 16. Delaying device 16 also has a delay time substantially equal to the time required to scan one line of the interlaced television raster and may be similar to delaying device 14. The output terminals of delaying device 16 are connected to an input circuit C of inverting amplifier 20. Amplifier 20 may be any amplifier which has provision for mixing and adjusting the amplitude of the input signals. In this embodiment of the invention each of the input signals at input circuits A and C are attenuated by a factor of four and added together. Amplifier 18 may be any amplifier which will invert the signal appearing at its input circuit B.

Also shown is a ganged switch having contacts 25*a* and 25*b*. When switch 25 is in the position in which contact 25*a* is closed and contact 25*b* is open, the output circuits of amplifiers 18 and 20 are both coupled to aperture correction signal output terminal 26. In this manner, the signal appearing at terminal 26 is the function B—¼ (A+C). This function is the vertical aperture correction signal. The invention as described thus far is the invention described and claimed in U.S. Pat. No. 3,030,440 issued Apr. 17, 1962, to O. H. Schade, Sr. and entitled "Vertical Aperture Correction."

"Combing" and horizontal aperture correction is accomplished by inserting a delaying device 22 between the output circuit of amplifier 18 and the output terminal 26. The receiving end of delaying device 22 is terminated by resistor 24 which is of a value relative to the characteristic impedance of the device 22 to prevent reflections of the wave energy impressed on the sending end of the device. The sending end of delaying device 22 is terminated by an impedance higher than the characteristic impedance of the delaying device, to cause reflections of wave energy impressed on the receiving end of the device. Connection of delaying device 22 and terminating resistor 24 into the circuit is accomplished by putting switch 25 into its operable position in which contact 25*a* is opened and contact 25*b* is closed.

Delaying device 22 may be a section of an artificial transmission line or a lumped constant delay line but it must be selected to have a delay time substantially equal to the time of 180° of the frequency to be combed. In this case, the subcarrier frequency, approximately 3.58 megacycles, is to be "combed" so the length of the delay line is equal to one-half the period of that frequency, or approximately 0.138 microseconds.

The subcarrier frequency is an odd multiple of one-half the line scanning frequency and is therefore 180° out of phase on alternate lines in a given field. As described in the Schade patent previously mentioned, the video signals appearing at inputs A, C and B of amplifiers 20 and 18 are derived from the line under consideration and the lines immediately preceding and succeeding the line under consideration.

The delaying device 22 is inserted in the B input circuit path before the summation of the signals appearing at input circuits A, B and C. Thus, the signal appearing at the B input circuit is delayed 180° at the subcarrier frequency. At the subcarrier frequency and at multiples of the line scanning frequency intervals around the subcarrier frequency the sum of the signals appearing at terminal 26 is equal to zero. The signals from the amplifier 20 are impressed on the delay device 22, and travel to the sending end from which they are reflected back to the receiving end where they additively combine with the unreflected signals from the amplifier 20 and the signals from amplifier 18. It should be noted that the delay time of delaying device 22 is very small relative to the delay time of delaying devices 14 and 16, so that vertical aperture correction is substantially unaffected. However, the aperture correction signal has been "combined" at the color frequencies and is thereby contained only in the luminance portions of the video frequency spectrum. In this manner high frequency noise in the correction signal is reduced and therefore will not show up as low frequency noise in the color signal as a result of heterodyning in the receiver chroma demodulator.

Horizontal aperture correction is accomplished by peaking the higher frequencies within the video bandwidth, which will sharpen the detail of the video signal in a horizontal direction. A horizontal aperture correction signal is developed and appears at terminal 26. The correction signal is the resultant of three components. The first component is the signal appearing at the output of amplifier 20. The second component is the inverted signal from amplifier 18 which has been delayed by delaying device 22. The third component is the result of a reflection of the component at the terminated receiving end of delaying device 22 from the open-circuited sending end.

With the delay time of delaying device 22 equal to one-half the period of the subcarrier frequency, the three components will result in zero correction signal at the subcarrier frequency and the addition of the components will result in maximum peaking of the luminance signal around the subcarrier frequency due to the frequency-amplitude response of the device 22, except at the previously mentioned periodic null points produced by combing. The components of any frequency appearing at either end of the delay line, substantially matched in impedance at one end and terminated to be reflective at the other, will always be either in phase or 180° out of phase with each other. This characteristic of the delay line which results in a linear phase-versus-frequency response enables the aperture correction signal to have a linear phase-versus-frequency characteristic. The result is symmetrical correction of the video signal for all frequencies within the video bandwidth.

It should be noted that a compromise between the "combing" effect and the peaking may be achieved by selecting delaying device 22 such that its delay is other than one-half the period of the subcarrier frequency. The correction signal will not then be zero at the subcarrier frequency but maximum peaking will be achieved at a frequency having a period twice the delay time of delaying device 22.

The combed vertical and horizontal aperture correction signal appearing at terminal 26 may be added to a video signal to correct that signal.

Figure 2:
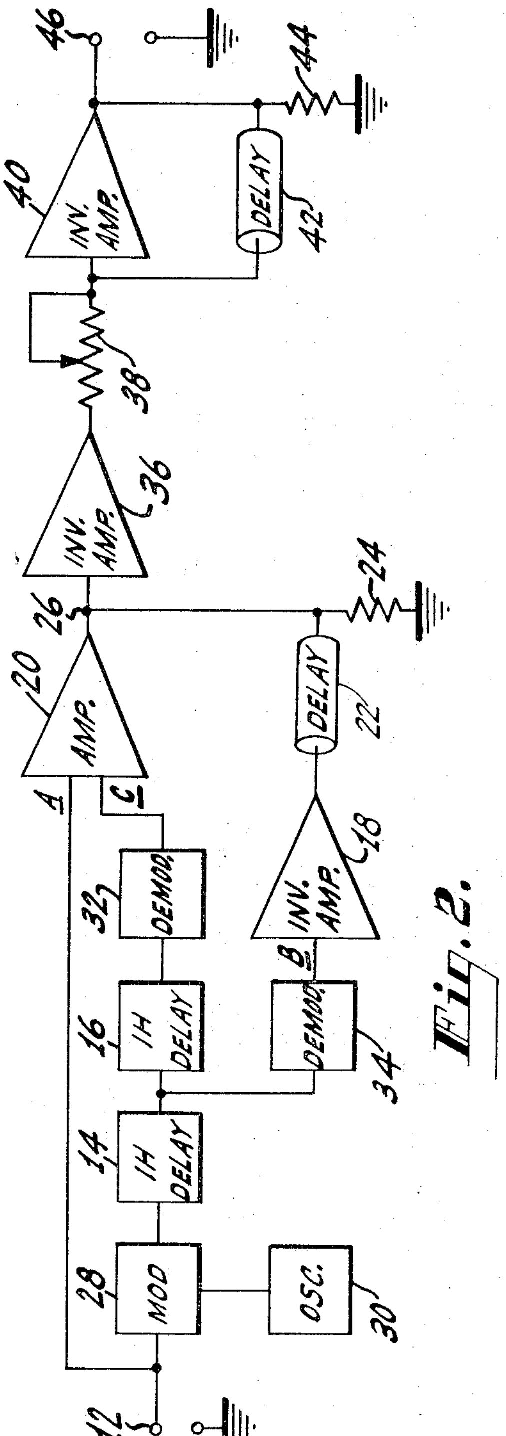
FIG. 2 is a functional diagram of another embodiment of the invention.

Referring now to FIG. 2, another embodiment of the invention is shown. Those components in FIG. 2 which perform the same function as in the embodiment of FIG. 1 retain the reference numerals used in FIG. 1.

Modulator 28 is connected between video signal input terminal 12 and the input of delaying device 14. Oscillator 30 is connected to modulator 28 and supplies the modulator with a locally generated sine wave at a frequency of 25 megacycles, for example. The modulator 28 heterodynes the video signal and the sine wave supplied by the oscillator 30 to produce a signal which is compatible with the characteristics of delaying devices 14 and 16. Ultrasonic delaying devices using quartz or glass as the delaying element are commercially available. The delaying devices should be selected such that they have a bandwidth as wide as the video signal bandwidth. The frequency of oscillator 30 should be selected such that the center frequency of the heterodyned video signal corresponds to the center frequency of delaying devices 14 and 16. Demodulators 32 and 34, respectively, are inserted between the output of delaying device 16 and input C of amplifier 20, and the output of delaying device 14 and input B of amplifier 18. Demodulators 32 and 34 demodulate the signals after they have passed through delaying devices 14 and 16. The use of modulators to heterodyne a video signal with an oscillator frequency for compatible operation with commercially available ultrasonic devices has been described in the previously mentioned Schade patent.

The operation of amplifiers 18 and 20 and delaying device 22 is the same as described in the embodiment in FIG. 1.

Also shown in FIG. 2 is an additional peaking circuit including amplifiers 36 and 40, attenuator resistor 38, delaying device 42 and terminating resistor 44. It may be desirable to keep the response of the aperture correction signal minimum at a given frequency such as the color subcarrier frequency, for example, and peak the response of the aperture correction signal at some other frequency. In this situation the delay time of delaying device 22 would be selected such that it is equal to one-half the period of the subcarrier frequency. Delaying device 42 in the additional peaking circuit would be selected such that its delay time is equal to one-half the period of the frequency at which peaking is desired.

Inverting amplifier 36 inverts the correction signal appearing at its input so that the signal appearing at output terminal 46 is of the same polarity as the signal at terminal 26. The operation of the additional peaking circuit is the same as the peaking circuit previously described. Variable resistor 38 controls the amplitude of the correction signal. The signal component appearing at the output of amplifier 40 is added to the component passed through delaying device 42 and the component reflected from the sending end of delaying device 42. It should be noted that the additional peaking circuit is in cascade with the terminal 26 and that the additional peaking is independent of the combing and peaking provided by delaying device 22. The independent peaking is also accomplished with a linear phase-versus-frequency characteristic because the delaying device 42 is open-circuited at its sending end and terminated at its receiving end.

It should be noted that the single delaying device 22 shown in FIGS. 1 and 2 may be replaced with two delaying devices connected in series, each having a delay time equal to one-half the period of the frequency to be combed and each terminated at its input and output terminals. Amplifier 20 would be adjusted to attenuate the A and C signals by a factor of two and the output of amplifier 20 would be connected to the input of the first delaying device as well as to terminal 26. The single output of amplifier 18 would be connected to the junction of the two series-connected delaying devices. In this manner a correction signal in the form of B−½ (A+C) would be produced.

The source of video signals connected to video input signal terminal 12 is obtained from the television system before gamma correction of the signal, and the aperture correction signal is added to the video signal after gamma correction. In this manner the correction signal, and any attendant noise from the input video signal, is not stretched at the black level and will therefore further decrease any noise which might be added to the video signal to be corrected. Although the black level video signals will not be enhanced as much as the gray and white levels with this arrangement it will not deteriorate the overall enhancement because correction of detail at the black level is less noticeable than correction of detail at the gray and white levels of the video signal. The correction signal obtained from terminal 26 of FIG. 1 or terminal 46 of FIG. 2 may be added to the luminance signal to correct that signal, or, the correction signal may be added to the separate red, green and blue video signals before they are matrixed to form the luminance signal.

We claim:

1. In a television system including a source of video signals which are to be employed to reproduce an image in successive fields having interlaced horizontal lines, apparatus to provide aperture distortion correction signals for correcting said video signals in both the horizontal and vertical directions, comprising:
   - an input terminal for a source of video signals;
   - an output terminal;
   - means providing a first signal path between said input and output terminals for delaying said video signals by a time substantially equal to the time to scan one of said horizontal lines, said means including a delaying device providing a one-half wave delay at a frequency near the upper end of said video signal frequency range and equal to an odd multiple of one-half the horizontal line scanning frequency;
   - means providing a second signal path between said input and output terminals for delaying said video signals by a time substantially equal to the time to scan two of said horizontal lines;
   - means providing a third signal path between said input and output terminals with no delay; and
   - means for inverting the polarity of said signals appearing in said first signal path relative to said signals appearing in said second and third signal paths.

2. Apparatus according to claim 1, wherein said delaying device connected in said first signal path between said input and output terminals has one end thereof coupled to said output terminal and terminated by an impedance of a value to substantially prevent reflections to the other end of said delaying device remote from said output terminal, and has said other end remote from said output terminal terminated in an impedance being of a value to reflect wave energy impressed on said output terminal.

3. Apparatus according to claim 1, wherein said means for inverting the polarity of signals appearing in said first signal path relative to said signals appearing in said second and third signal paths includes means for amplifying said inverted signals relative to said uninverted signals.

4. Apparatus according to claim 2, wherein said means for inverting the polarity of said signals is connected in said first signal path between said input terminal and the end of said delaying device remote from said output terminal.

5. Apparatus according to claim 2, wherein said means for inverting the polarity of said signals is connected in said second signal path between said input and output terminals and in said third signal path between said input and output terminals.

6. Apparatus according to claim 2, wherein said delaying device has a delay time substantially equal to one-half the period of the color subcarrier frequency in said television system.

7. Apparatus according to claim 4, wherein said means for inverting said signals appearing in 4, first signal path amplifies said signals appearing in said first signal path by a factor of four relative to said signals appearing in said second and third signal paths.

8. In a television system including a source of video signals which are to be employed to reproduce an image in successive fields having interlaced horizontal lines, apparatus to provide aperture distortion correction signals for correcting said video signals in both the horizontal and vertical directions, comprising:
   - a video signal input terminal coupled to said source of video signal;
   - means including a first delay line having an input terminal and an output terminal, said input terminal being coupled to said video signal input terminal for delaying said signals for a time substantially equal to the time to scan one of said lines;
   - means including a second delay line having an input terminal and an output terminal and having characteristics similar to said first delay line, said input terminal of said second delay line being coupled to said output terminal of said first delay line;
   - a correction signal output terminal;
   - means having first and second input terminals and an output terminal and having its first input terminal coupled to said output terminal of said second delay line and having its second input terminal coupled to said source of video signals for combining the signal appearing at said output terminal of said second delay line and said video signal and having its output terminal coupled to said correction signal output terminal;
   - means having an input and an output terminal and having its input terminal coupled to the output terminal of said first delay line for inverting a signal appearing at the output terminal of said first delay line; and
   - delaying means having an input terminal and an output terminal and having its input terminal terminated in an impedance being of a value to reflect wave energy impressed on its output terminal, said input terminal also being coupled to said output terminal of said means for inverting a signal and its output terminal terminated by an impedance of a value to substantially prevent reflections of wave energy from said output terminal, said output terminal of said delaying means also being coupled to said correction signal output terminal, said delaying means having a delay time equal to one-half the period of an odd multiple of said line scanning frequency, whereby said delaying device produces periodic and alternate nulls and peaks on said aperture distortion correction signal and causes said aperture distortion correction signal to have a linear phase characteristic for all frequencies within said video signal bandwidth.

9. Apparatus according to claim 8, wherein there is also included a frequency peaking network comprising:
   - first amplifying means having input and output terminals;
   - second amplifying means having input and output terminals;
   - second delaying means having input and output terminals;
   - a second signal output terminal;
   - said input terminal of said first amplifying means being coupled to said first output signal terminal and said output terminal of said first amplifying means being coupled to said input terminal of said second amplifying means;
   - said input terminal of said second delaying means being coupled to said output terminal of said first amplifying means and being terminated in an impedance to produce reflections of the signal appearing at said second signal output terminal, and said output terminal of said second delaying means being coupled to said second signal output terminal and being terminated in an impedance such as to prevent reflection of wave energy appearing at said delaying device input terminal;
   - said output terminal of said second amplifying means being coupled to said second signal output terminal, whereby;
   - said aperture distortion correction signal appearing at said second signal output terminal will be peaked at a frequency having a period equal to twice the delay time of said second delaying means other than a period equal to an odd multiple of said line scanning frequency without affecting said nulls of said aperture distortion correction signal and without changing the phase of said aperture distortion correction signal components within said video signal bandwidth.

10. Apparatus according to claim 8, wherein there is also included:

modulator means;
oscillator means;
first demodulator means;
second demodulator means;
said modulator means being connected between said video input signal terminal and said input terminal of said first delay line;
said oscillator means being coupled to said modulating means to supply a sine wave frequency to said modulating means;
said first demodulator means connected between said output terminal of said first delay line and said input terminal of said means for inverting a signal;
said second demodulator means being connected between said output terminal of said second delay line and said first input terminal of said means for combining said signal appearing at said output of said second delay line and said video signal; whereby
the frequency of said oscillator is selected such that when heterodyned with said video signal the heterodyned video signal has a center frequency substantially equal to the center frequency transmitted by said first and second delay lines, and said first and second demodulator means demodulate said heterodyned signals appearing at said output terminals of said first and second delay lines.

11. Apparatus according to claim 9, wherein the delay time of said first delaying means is substantially equal to one-half the period of said color subcarrier frequency of said television system whereby said aperture distortion correction signal is produced having periodic null points at said color subcarrier frequency and at line scanning frequency intervals around said color subcarrier frequency, and whereby said aperture distortion correction signal is produced having a peak around said color subcarrier frequency at other than said null points.